US010982658B2

(12) United States Patent
Garcia de la Pena Razquin

(10) Patent No.: US 10,982,658 B2
(45) Date of Patent: Apr. 20, 2021

(54) METHOD AND EQUIPMENT FOR REPAIRING THE ROOTS OF WIND TURBINE BLADES

(71) Applicant: EMPRENDING BUSINESS, S.L.L., Gorraiz (ES)

(72) Inventor: Emmanuel Garcia de la Pena Razquin, Gorraiz (ES)

(73) Assignee: EMPRENDING BUSINESS, S.L.L., Gorraiz (ES)

( * ) Notice: Subject to any disclaimer, the term of this patent is extended or adjusted under 35 U.S.C. 154(b) by 183 days.

(21) Appl. No.: 16/320,374

(22) PCT Filed: Sep. 5, 2016

(86) PCT No.: PCT/ES2016/070622
§ 371 (c)(1),
(2) Date: Jan. 24, 2019

(87) PCT Pub. No.: WO2018/042063
PCT Pub. Date: Mar. 8, 2018

(65) Prior Publication Data
US 2019/0264660 A1 Aug. 29, 2019

(51) Int. Cl.
*F03D 80/50* (2016.01)
*B23B 39/20* (2006.01)
*F03D 1/06* (2006.01)

(52) U.S. Cl.
CPC .............. *F03D 80/50* (2016.05); *B23B 39/20* (2013.01); *B23B 2215/76* (2013.01);
(Continued)

(58) Field of Classification Search
CPC ... B23B 39/18; B23B 47/281; B23B 2215/81; Y10T 29/49726
See application file for complete search history.

(56) References Cited

U.S. PATENT DOCUMENTS 4,412,784 A * 11/1983 Wackerle .............. F03D 1/0658
416/230
4,915,590 A * 4/1990 Eckland ................ F03D 1/0658
416/225
(Continued)

FOREIGN PATENT DOCUMENTS

DE 102014205195 A1 9/2015
EP 2920457 B1 9/2015

OTHER PUBLICATIONS

International Search Report and Written Opinion dated May 4, 2017 for PCT/ES2016/070622 and English translation.

*Primary Examiner* — Jason L Vaughan
(74) *Attorney, Agent, or Firm* — Lucas & Mercanti LLP

(57) ABSTRACT

Method and equipment for repairing the roots of wind turbine blades, by drilling on the root of the blade, and through the ring thereof, radial bore holes located in positions that radially match the axial threaded blind holes of the ring; grinding and drilling the axial threaded blind holes to remove the thread, and to achieve the extension of the ground axial holes until they reach the matching radial bore hole; introducing, into each radial bore hole, a pin provided with a threaded diametral passage aligned with a threaded axial hole of the ring; screwing bolts into the axial threaded blind holes and threaded diametral passages, for fastening the blade to the hub of the wind turbine. The equipment has a support that can be fastened to the reinforcement ring and a head for carrying radial and axial drilling tools.

2 Claims, 5 Drawing Sheets

(52) U.S. Cl.
CPC ........ *F03D 1/0658* (2013.01); *F05B 2230/80* (2013.01); *F05B 2260/301* (2013.01); *Y02E 10/72* (2013.01); *Y02P 70/50* (2015.11)

(56) References Cited

U.S. PATENT DOCUMENTS

| | | | |
|---|---|---|---|
| 7,517,194 B2* | 4/2009 | Doorenspleet | F03D 1/0658 |
| | | | 416/204 R |
| 8,591,187 B2* | 11/2013 | Bagepalli | F03D 17/00 |
| | | | 416/1 |
| 9,370,905 B2* | 6/2016 | Moeller Larsen | F03D 1/0658 |
| 9,777,704 B2* | 10/2017 | Minadeo | F03D 1/0658 |
| 9,890,022 B2* | 2/2018 | Neumann | F03D 1/0675 |
| 10,190,571 B2* | 1/2019 | Samudrala | F03D 1/0658 |
| 2012/0230827 A1 | 9/2012 | Dawson et al. | |
| 2014/0334934 A1* | 11/2014 | Kannenberg | F03D 1/0675 |
| | | | 416/217 |
| 2014/0356176 A1 | 12/2014 | Caruso | |

* cited by examiner

-PRIOR ART-

-PRIOR ART-

# METHOD AND EQUIPMENT FOR REPAIRING THE ROOTS OF WIND TURBINE BLADES

CROSS REFERENCE TO RELATED APPLICATION

This Application is a 371 of PCT/ES2016/070622 filed on Sep. 5, 2016 which is incorporated herein by reference.

FIELD OF THE INVENTION

The present invention relates to a method for repairing wind turbine blades, and more specifically for repairing the roots of wind turbine blades, which includes a ring as means for attaching the blade to the wind turbine hub and has the purpose of solving the problem caused by the occurrence of cracks in said ring.

STATE OF THE ART

In blades including a reinforcement ring in the root, the bolts for anchoring to the wind turbine hub are fixed on threaded axial blind holes made on the ring along the entire perimeter thereof. Due to machining defects in these threaded axial blind holes, cracks which propagate over time due to the stress and fatigue to which the ring is subjected develop in the ring.

The propagation of these cracks can often lead to the ring breaking, so the blade comes shooting out due to the centrifugal force caused by the rotation of the rotor.

These circumstances have compelled wind farm-operating companies to implement preventive and corrective measures, such as monitoring the state of the cracks by means of ultrasounds or X-ray, so that if they exceed the critical length defined by the blade manufacturer, the blade is replaced with a new one that does not have the mentioned machining defects.

Patent document US2014356176 discloses a particular attachment in which hollow sleeves ("inserts") are incorporated in the axial holes to subsequently insert bolts for attachment to the hub into those hollow sleeves so that said hollow sleeves support the preload generated in the attachment.

The blade described in patent document US 2014356176 does not include a reinforcement ring in the root, nor does it include threaded axial blind holes in the wall of the blade root; rather, it includes axial through holes in a smooth wall, each of which housing a sleeve through which a bolt freely passes, said sleeve being the element that withstands compression due to the preload of the bolt during the operation of the wind turbine.

With respect to the problem at hand, the presence of said sleeve would prevent the necessary compression in the reinforcement ring from taking place, and therefore the effect of preventing crack propagation would not be achieved. In other words, the solution described in the mentioned patent does not solve the problem at hand.

DESCRIPTION OF THE INVENTION

The present invention is applicable to wind turbine blades having a reinforcement ring in the root as the element for attachment to the hub, said ring generally being made of aluminum and forged, machined, and embedded between the resin and glass fiber fabrics of the blade root. Said ring incorporates a series of threaded axial blind holes which receive the bolts for attachment to the hub bearing, serving as an interface between the blade and the wind turbine hub.

The object of the present invention is to solve the aforementioned problem by means of a method for repairing that allows recovering the ring from the root of the wind turbine blades when cracks which may cause the blades to break occur therein, without having to replace same.

Another object of the invention is the equipment by means of which the mentioned method is carried out.

According to the method of the invention, in order to prevent the occurrence and/or propagation of cracks in the ring of the root of a wind turbine blade, a series of radial bore holes is made in the ring, through the wall of the blade root, preferably in a number equal to the number of threaded blind holes of the ring, the axes of said holes being located on one and the same plane perpendicular to the axis of the blade and located axially between the bottom of said threaded axial blind holes and the edge with the smallest section of the ring, and being coplanar with and perpendicular to the axes of the coinciding threaded axial blind holes.

In other words, the radial bore holes are located in radial positions coinciding with the threaded axial blind holes, with the axes thereof on a plane perpendicular to the axis of the blade which is axially located between two other planes, also perpendicular to the axis of the blade, i.e., a first plane coinciding with the bottom of the threaded axial blind holes and a second plane coinciding with the edge with the smallest section of the reinforcement ring.

The threaded axial blind holes are then axially ground and extended to eliminate the thread at least partially, and extend the ground axial holes until they reach the coinciding radial bore hole that has been made beforehand.

A pin which has a diameter that is almost the same as the diameter of said radial bore hole and can be provided with a threaded diametrical passage having a diameter that is the same as or slightly smaller than the diameter of said ground axial hole is inserted into each radial bore hole, the diametrical passage being positioned in alignment with the ground axial hole. The pins may not have the diametrical passage, in which case such passage and its thread are made after the pin is assembled in the radial bore hole, as will be explained below.

Finally, bolts having a measurement coinciding with the measurement of the threaded diametrical passages of the pins are inserted through the ground and extended axial holes, and they are screwed into said threaded diametrical passages to be used as means for anchoring the blade to the wind turbine hub.

Where necessary, an adhesive and/or a sealant can be applied between the surface of the radial bore holes and pins.

When the method of the invention is applied to rings with cracks to prevent their propagation, the radial bore holes are made on said ring shifted towards the edge with the smallest section of said ring with respect to the position of the crack or cracks, such that said cracks are compressed once the threaded bolts are assembled.

According to another aspect of the invention, the radial bore holes are made on the ring and the threaded axial blind holes are ground and extended with equipment comprising a support configured for being fixed on the reinforcement ring, and a head which is assembled in the support in a selectable position. The head holds means for making radial bore holes, which are intended for receiving each pin, in the reinforcement ring, through the wall of the root.

The head furthermore holds means for axially grinding and drilling the threaded axial blind holes, eliminating the thread of said threaded axial blind bore holes and extending the ground axial blind holes, until they reach the coinciding radial bore holes.

When the pins assembled in the radial bore holes of the reinforcement ring have no diametrical passage, the head can hold means for producing in each pin, through the coinciding ground axial hole, a cylindrical diametrical passage and the thread of said passage.

The head is assembled in the support in a selectable position and furthermore holds means to perform grinding and to extend the threaded axial blind holes in an axial manner, eliminating the thread at least partially and extending the ground axial holes until they reach the coinciding radial bore holes. The head can also hold means for producing in each pin a cylindrical diametrical passage and the thread of said diametrical passage for the case in which the assembled pins do not have said diametrical passage.

The support consists of a star-shaped structure made up of a central core from which the head is suspended with ease of rotation and height adjustment with respect to said ring, and a series of radial profiles which are supported and anchored at the end thereof on/to threaded axial blind holes of the reinforcement ring.

The head in turn comprises a central body through which said head is suspended from the central core of the support. Radial arms project from this central body, which radial arms are able to be radially and axially positioned with respect to the threaded axial blind holes of the ring and holding means to perform the mentioned drilling and grinding which consist of a radial drilling tool and an axial drilling tool, the former for making radial bore holes in the wall of the ring, going through the wall of the root, with the axes thereof in a position coplanar with the axes of the threaded axial blind holes, and the latter for grinding the threaded axial blind holes and extending them until they reach the coinciding radial bore holes.

BRIEF DESCRIPTION OF THE DRAWINGS

A possible embodiment given by way of non-limiting example is shown in the attached drawings, in which.

DETAILED DESCRIPTION OF AN EMBODIMENT

Figure 1:
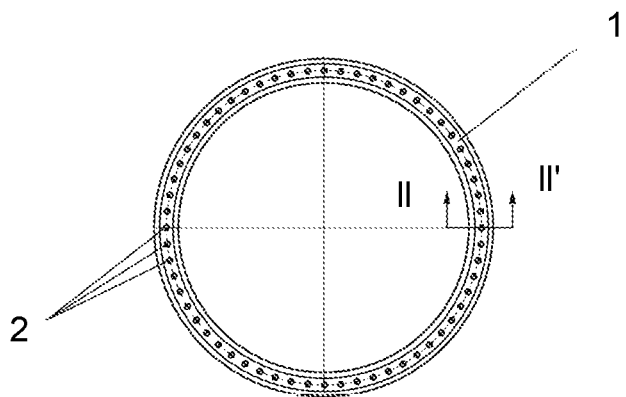
FIG. 1 shows a front view of the root of a wind turbine blade.
Figure 2:
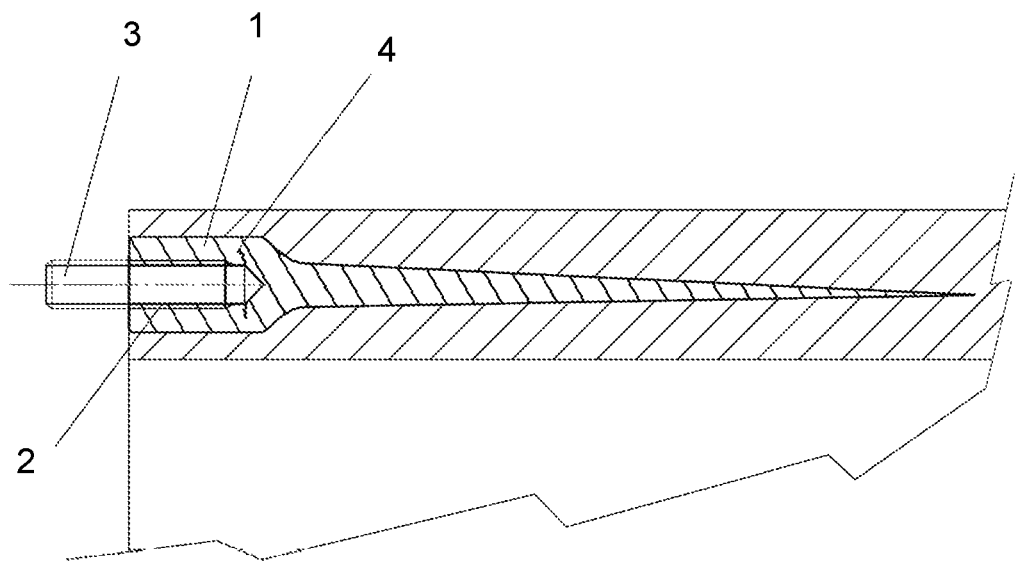
FIG. 2 shows, on a larger scale, a section of the blade root and ring contained therein, taken along section line II-II of FIG. 1.

FIG. 1 shows a plan view of the blade root incorporating a ring (1) provided with several threaded axial blind holes (2) into which the threaded bolts (3) are screwed, FIG. 2, for fixing to the bearing of the wind turbine hub.

The section view of FIG. 2 shows a crack (4) in the ring, the propagation of which can cause the blade to break and fall off.

Figure 3:
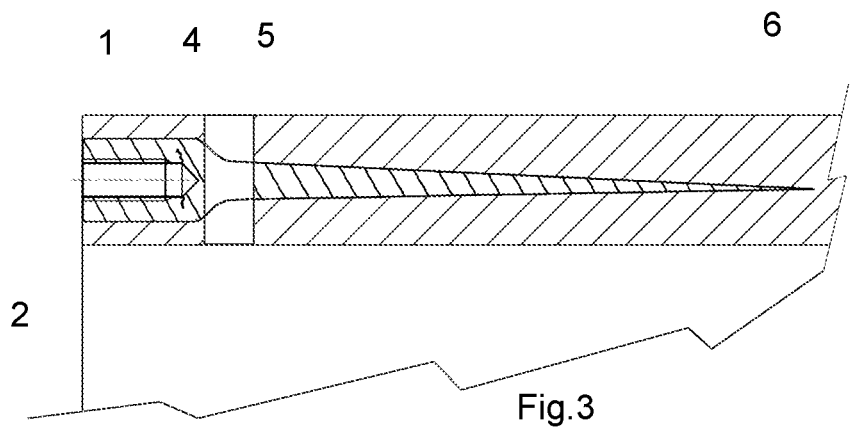
FIG. 3 shows a view similar to FIG. 2, with a radial bore hole going through the wall of the root and the ring.

To eliminate this problem, according to the invention, a series of radial bore holes (5) are made in the blade root, FIG. 3, going through the ring (1), and located in axial positions coinciding with at least part of the threaded axial blind holes (2) and preferably with all of said threaded axial blind holes.

The axes of all the radial bore holes are located on one and the same plane, perpendicular to the axis of the blade, said plane is located between the bottom of the threaded axial blind holes (2) and the edge (6) with the smallest section of the ring (1). Furthermore, these axes are coplanar with and perpendicular to the axes of the coinciding threaded axial blind holes (2).

Figure 4:
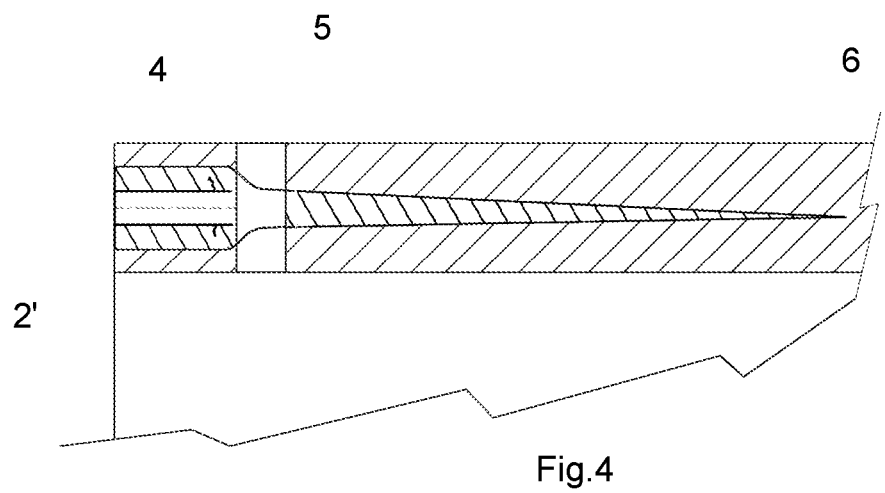
FIG. 4 shows a view similar to FIG. 3, with the ground and extended axial blind holes.

As shown in FIG. 4, the threaded axial blind holes (2) are ground and extended by means of the corresponding tool to eliminate the thread at least partially and extend said hole until it reaches the coinciding radial bore hole (5), a ground axial blind hole (2') having a greater depth being obtained.

Figure 5:
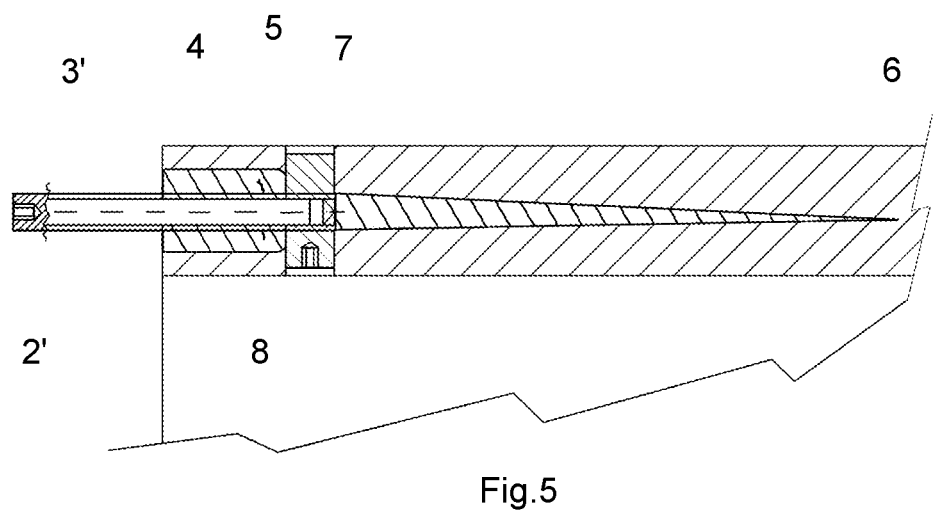
FIG. 5 shows a view similar to FIG. 4, with a pin housed in the radial bore hole.
Figure 6:
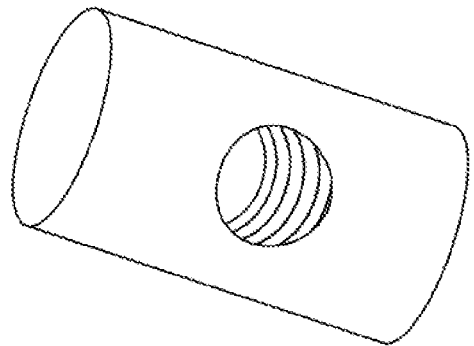
FIG. 6 shows a perspective view of the pin with its threaded diametrical passage included in the radial bore hole of FIG. 5.

As best seen in FIG. 6, a pin (7) which is provided with a diametrical passage (8) with an inner thread is arranged in each radial bore hole (5), FIG. 5. The pins (7) are arranged such that the threaded diametrical passages (8) are aligned with the ground axial holes (2').

The radial bore holes are made such that they are shifted towards the edge (6) with the smallest section of the ring, with respect to the position of the crack (4).

Threaded bolts (3') that are longer than the original bolts (3), with the same measurement as the measurement of the threaded passages (8) of the pins (7), FIG. 5, are inserted through the ground axial holes (2'), screwed into said passages, to be used as means for anchoring the blade to the wind turbine hub.

The pins (7) will have a diameter that is almost the same as the diameter of the radial bore holes (5) and an adhesive and/or a sealant can be applied between them to assure the attachment of the pin in the radial bore hole and prevent the rotation or movement of the pin with respect to the passage in which it is housed, in the event of disassembling the blade, providing at the same time more robustness to the assembly.

When the pins (7) do not have the threaded diametrical passage (8), said bore hole must be made once the pin is assembled in the radial bore hole (5), an operation that will be carried out by means of the corresponding drilling and thread-making tool inserted through the ground axial hole (2').

Figure 7:
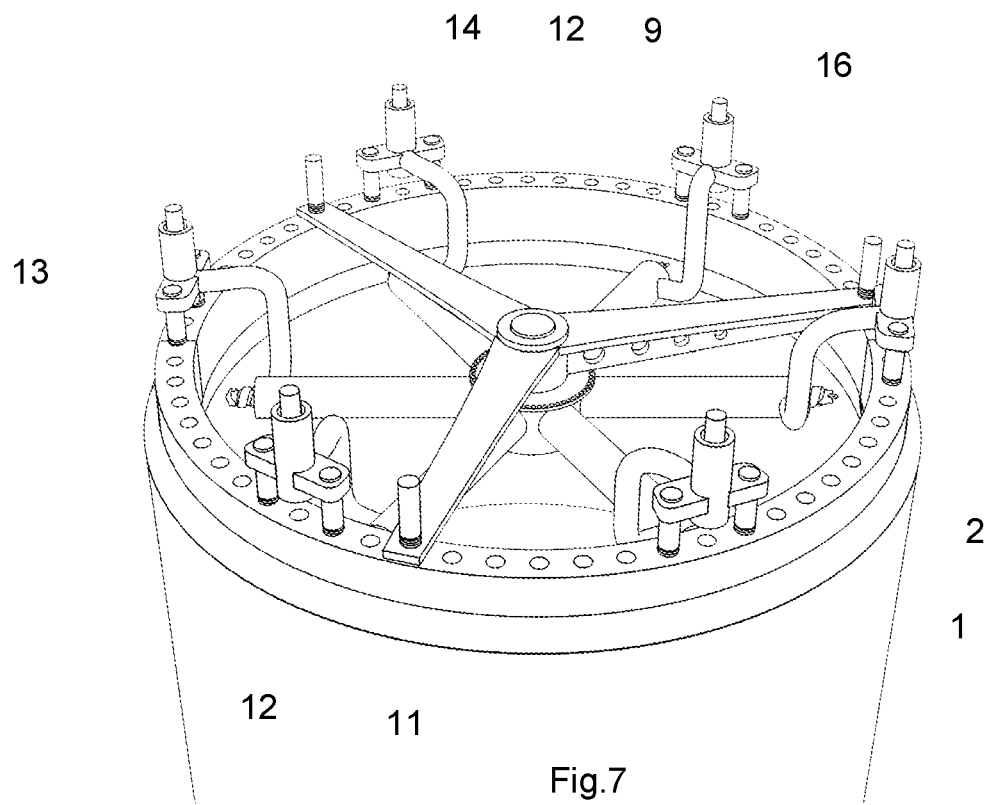
FIG. 7 shows a perspective view of the ring with equipment for repairing assembled therein.

In order to perform the different grinding, drilling, and screwing operations, equipment such as the one shown in FIG. 7 can be used, said equipment being made up of a support (9) configured for being assembled in and fixed on the reinforcement ring (1) through its threaded axial blind holes (2), and a head (10) which is assembled in the support (9) in a selectable position.

The head (10) comprises a central body (11) with radial arms (12) projecting therefrom, each of which holds radial drills (13) and axial drills (14) which make up the means for making radial bore holes (5), grinding and extending the threaded axial blind holes (2), and where appropriate, producing the threaded diametrical passages (8).

The support (9) consists of a star-shaped structure made up of a central core (15) and radial profiles (16). The central body (11) of the head (10) is suspended from the central core

(15) with ease of rotation and height adjustment. The radial profiles (16) are screwed on the threaded axial blind holes (2) and the ends of the radial arms (12) are positioned in the threaded axial blind holes (2) of the ring through positioning elements made up of retractable dowels or balls (12'), for example.

Figure 8:
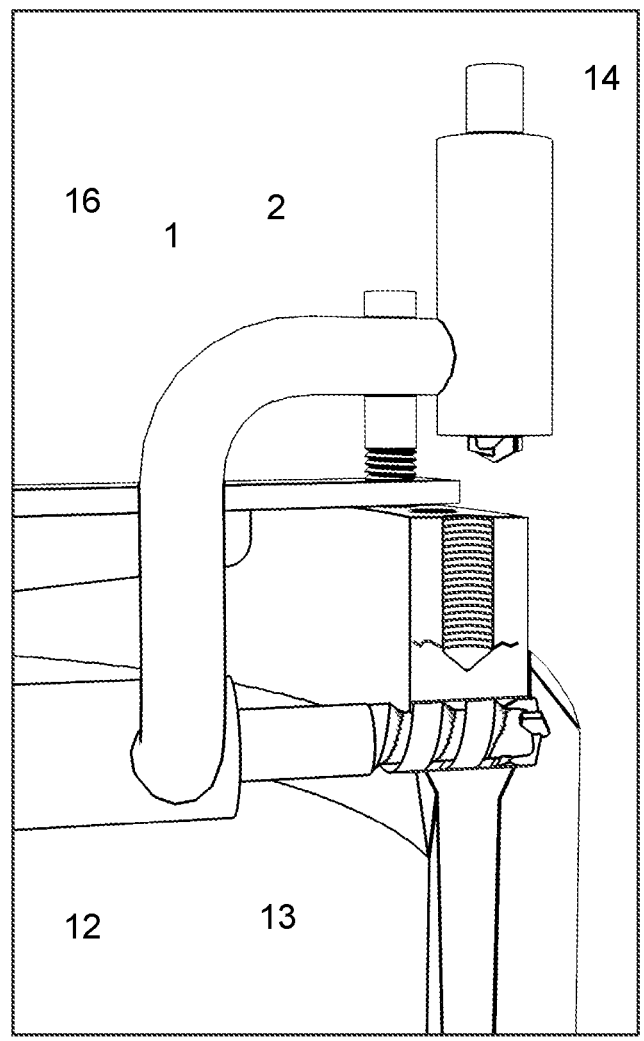
FIG. 8 shows a section of the ring, in which the making of the radial bore holes by means of the equipment of FIG. 1 can be seen.
Figure 9:
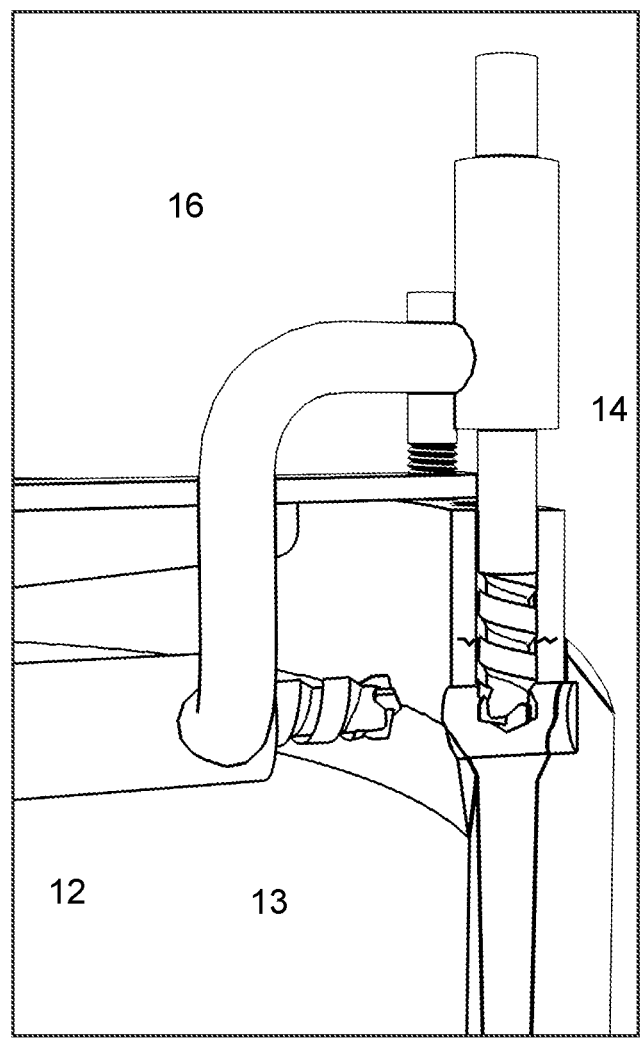
FIG. 9 shows a section similar to FIG. 8, in which the grinding and extension of the threaded axial blind holes can be seen.

FIG. 8 shows the production of the radial bore holes (5) by means of a radial drill (13), whereas FIG. 9 shows the operation of grinding and extending the threaded axial blind holes (2) until reaching the radial bore holes (5) by means of an axial drill (14) which will be replaced, where necessary, with the tool required for producing the diametrical passages (8) and for making threads therein.

Once the different operations described in a first position of the equipment have come to an end, the head (10) is rotated to carry out the same operation in the next position, in which a new group of radial bore holes (5), ground axial holes (2'), etc., is obtained. This goes on until the required operations come to an end.

To machine the position corresponding to the starting position of the radial profiles (16), the star-shaped structure is rotated and fixed to adjacent holes which allow accessing the radial arms (12) with tools.

In order to make positioning the pins (7) in the radial bore holes easier so that the diametrical passage (8) of said pins is aligned with the corresponding ground axial blind hole (2'), said pins will have on one of their faces an indentation (7'), FIG. 5, for example, a housing for an Allen key, which allows them to be easily rotated until reaching the position of alignment mentioned above. Similarly and to make the placement thereof easier, the threaded bolts (3') can have a recess, indentation, or slot (3"), for example, for an Allen key, which allows them to rotate and be screwed into the threaded diametrical passages (8) of the pins (7) without any damage to their thread.

The dimension and the alignment of the threaded axial blind holes (2) with the diametrical passages (8) is assured by utilizing the pre-existing threaded axial blind holes of the ring (1), as well as the geometry of the root, to position the described equipment.

Preferably, the diametrical passages (8) will be made to coincide with all the threaded axial blind holes (2) of the ring (1), or at least in a sufficient number to eliminate the effect of the existing cracks (4), the risk of the occurrence of new cracks, and to assure a robust attachment of the blade to the wind turbine hub.

The invention claimed is:

1. A method for repairing wind turbine blades, comprising a reinforcement ring embedded in a blade root, provided with threaded axial blind holes for receiving threaded bolts for fixing to a wind turbine hub through a bearing, which method is particularly conceived to prevent the occurrence and/or propagation of cracks in said reinforcement ring, the method comprising:
   a) making on the reinforcement ring, through a wall of the blade root, a series of radial bore holes, the axes of which are located on one and a same plane perpendicular to an axis of the blade, coplanar with and perpendicular to the axes of the threaded axial blind holes, and located axially between a plane containing a bottom of said threaded axial blind holes and a plane containing an edge with a smallest section of the reinforcement ring;
   b) grinding and drilling the threaded axial blind holes to eliminate a thread and extend said ground axial holes until they reach a coinciding radial bore hole;
   c) inserting into each radial bore hole a pin which has a diameter that is approximately the same as the diameter of the radial bore hole, is provided with a threaded diametrical passage having a diameter slightly smaller than the diameter of said ground axial hole, and positioned in alignment with a ground and extended axial hole;
   d) inserting through the ground and extended axial holes bolts having a measurement coinciding a measurement of the threaded diametrical passage of the pins, and screwing the bolts into said threaded diametrical passages for anchoring the blade to the wind turbine hub;
   e) making the radial and axial holes at the same time, by radial and axial drilling means synchronized in more than one position, with an on-site portable precision drilling tool, with a support and a head, both referenced to the ground threaded axial blind holes to ensure the needed alignment accuracy for being able to assembly the bolts to the pins in a following operation.

2. A method for repairing wind turbine blades, comprising a reinforcement ring embedded in a blade root, provided with threaded axial blind holes for receiving threaded bolts for fixing to a wind turbine hub through a bearing, a support configured for being fixed to the reinforcement ring, and a head which is assembled in the support in a selectable position, which head holds means for making radial bore holes in the reinforcement ring, through the wall of the root, each intended for receiving a pin, and means for axially grinding and drilling the threaded axial blind holes, eliminating the thread of said holes and extending same until they reach the coinciding radial bore holes,
   which method is particularly conceived to prevent the occurrence and/or propagation of cracks in said reinforcement ring, the method comprising:
   a) making on the reinforcement ring, through a wall of the blade root, a series of radial bore holes, axes of which are located on one and a same plane perpendicular to an axis of the blade, coplanar with and perpendicular to the axes of the threaded axial blind holes, and located axially between a plane containing a bottom of said threaded axial blind holes and a plane containing an edge with a smallest section of the reinforcement ring;
   b) grinding and drilling the threaded axial blind holes to eliminate a thread and extend said ground axial holes until they reach a coinciding radial bore hole;
   c) inserting into each radial bore hole a pin which has a diameter that is approximately the same as the diameter of the radial bore hole, is provided with a threaded diametrical passage having a diameter slightly smaller than the diameter of said ground axial hole, and positioned in alignment with a ground and extended axial hole;
   d) inserting through the ground and extended axial holes bolts having a measurement coinciding a measurement of the threaded diametrical passage of the pins, and screwing the bolts into said threaded diametrical passages for anchoring the blade to the wind turbine hub;
   e) making the radial and axial holes at the same time, by radial and axial drilling means synchronized in more than one position, with an on-site portable precision drilling tool, with a support and a head, both referenced to the ground threaded axial blind holes to ensure the needed alignment accuracy for being able to assembly the bolts to the pins in a following operation.

\* \* \* \* \*